(12) United States Patent
Rodrigues et al.

(10) Patent No.: US 11,828,389 B2
(45) Date of Patent: Nov. 28, 2023

(54) PIPE SPOOLING FOR REEL-LAY OPERATIONS

(71) Applicant: Subsea 7 do Brasil Servicos Ltda, Niteroi (BR)

(72) Inventors: Daniel Sahonero Rodrigues, Rio de Janeiro (BR); Irio Rodrigues Freire Neto, Niteroi (BR)

(73) Assignee: Subsea 7 do Brasil Servicos LTDA, Rio de Janeiro (BR)

( * ) Notice: Subject to any disclaimer, the term of this patent is extended or adjusted under 35 U.S.C. 154(b) by 246 days.

(21) Appl. No.: 17/298,937

(22) PCT Filed: Nov. 28, 2019

(86) PCT No.: PCT/BR2019/050507
§ 371 (c)(1),
(2) Date: Jun. 1, 2021

(87) PCT Pub. No.: WO2020/107089
PCT Pub. Date: Jun. 4, 2020

(65) Prior Publication Data
US 2022/0065366 A1    Mar. 3, 2022

(30) Foreign Application Priority Data
Nov. 30, 2018  (GB) .................................. 1819624

(51) Int. Cl.
*F16L 1/20*    (2006.01)
*F16L 25/14*   (2006.01)
*F16L 1/16*    (2006.01)

(52) U.S. Cl.
CPC .............. *F16L 1/203* (2013.01); *F16L 1/161* (2013.01); *F16L 25/14* (2013.01)

(58) Field of Classification Search
CPC ............ F16L 1/166; F16L 1/203; F16L 25/14
See application file for complete search history.

(56) References Cited

U.S. PATENT DOCUMENTS 2,777,500 A    1/1957   Ekholm et al.
3,105,537 A    10/1963  Foster
(Continued)

FOREIGN PATENT DOCUMENTS

| EP | 0 163 056 | 12/1985 |
| FR | 1.056.665 | 3/1954 |
| GB | 2518376 | 3/2015 |
| GB | 2545786 | 10/2016 |

(Continued)

OTHER PUBLICATIONS

U.S. Pat. No. 203,842, issued Nov. 1, 1877, to Leland, Edwin A.
(Continued)

*Primary Examiner* — Reinaldo Sanchez-Medina
(74) *Attorney, Agent, or Firm* — Mattingly & Malur, PC

(57) ABSTRACT

Lined pipelines with different inner diameters are spooled successively onto a reel while their constituent pipe stalks are cyclically pressurised internally to combat wrinkling of the liner. A first, variable diameter pig is advanced to a trailing end of a first pipeline. A transition joint is attached to the trailing end of the first pipeline to effect a transition from the inner diameter of the first pipeline to the different inner diameter of a second pipeline. A leading end of the second pipeline, containing a second pig, is attached to the transition joint. The first pig is driven through the transition joint into the second pipeline. The diameter of the first pig changes to match the inner diameter of the second pipeline. The first and second pigs are then driven along the second pipeline when assembling the second pipeline from a succession of pipe stalks.

14 Claims, 4 Drawing Sheets

(56) References Cited

U.S. PATENT DOCUMENTS

| | | | | |
|---|---|---|---|---|
| 4,629,218 A * | 12/1986 | Dubois | ............ | E21B 17/20 |
| | | | | 138/155 |
| 4,984,934 A * | 1/1991 | Recalde | ............ | F16L 1/203 |
| | | | | 405/166 |
| 5,590,915 A | 1/1997 | Recalde | | |
| 8,226,327 B2 | 7/2012 | Endal et al. | | |
| 8,806,735 B2 * | 8/2014 | Howard | ............ | B65H 55/00 |
| | | | | 29/469 |
| 9,638,352 B2 | 5/2017 | Varfolomeev | | |
| 10,718,448 B2 | 7/2020 | Endal et al. | | |
| 2012/0269581 A1 * | 10/2012 | Mair | ............ | F16L 1/161 |
| | | | | 405/168.1 |
| 2020/0096134 A1 * | 3/2020 | De Jong | ............ | F16L 1/20 |

FOREIGN PATENT DOCUMENTS

| | | |
|---|---|---|
| WO | WO 93/08422 | 4/1993 |
| WO | WO 99/64180 | 12/1999 |
| WO | WO 2008/072970 | 6/2008 |
| WO | WO 2010/010390 | 1/2010 |
| WO | WO 2011/048430 | 4/2011 |
| WO | WO 2011/051218 | 5/2011 |
| WO | WO 2013/175280 | 11/2013 |

OTHER PUBLICATIONS

American Petroleum Institute API Specification 5L, "Specification for Line Pipe," Jul. 2013 (45th ed.).
DNV-GL Standard DNVGL-ST-F101, "Submarine pipeline systems," Oct. 2017.
ASME Publication B31.3, "Process Piping," 2020.

\* cited by examiner

PIPE SPOOLING FOR REEL-LAY OPERATIONS

This invention relates to pipe spooling as a precursor to reel-laying of subsea pipelines, whose main application is in the subsea oil and gas industry.

Reel-lay operations involve winding or spooling a continuous pipe formed of welded elements onto a reel of a pipelaying vessel, to be unwound or unspooled subsequently during pipelaying at sea. Fabrication and spooling of the pipe typically takes place at a spoolbase that the vessel visits when necessary for loading.

Fabricating a pipe for reel-lay operations typically involves welding together pipe joints at a spoolbase to form long straight stalks. The welds between pipe joints are tested and coated and then the resulting stalks are stored beside each other at the spoolbase. When a pipelaying vessel is ready to be loaded, the stalks are welded together successively end-to-end to create a continuous length of pipe while the pipe is being wound onto the reel of the vessel. It is advantageous to prefabricate stalks for stalk-to-stalk welding and coating during spooling so that the more numerous joint-to-joint welding and coating operations that are necessary to fabricate the stalks can be performed while the pipelaying vessel is at sea.

It is also possible for a pipe to be wound onto an intermediate storage reel after fabrication at a spoolbase, to be unwound subsequently from the storage reel and simultaneously wound onto a reel of a pipelaying vessel. The present invention encompasses this possibility.

Nominally rigid pipes have enough flexibility to be bent if a minimum bend radius is observed. When spooling, bending extends beyond elastic limits into plastic deformation of the pipe that must be recovered by subsequent straightening processes during laying.

Bending deformation of a pipe upon spooling and unspooling develops considerable stresses and strains in the pipe wall, including ovalisation in transverse cross-section. Particular problems arise when bending a lined pipe, which may be required for handling well fluids containing corrosive agents such as hydrogen sulphide and chlorides.

A lined pipe typically comprises a load-bearing, thick-walled, high-strength, outer pipe of low-alloy carbon steel, lined with a thin-walled liner sleeve of a corrosion-resistant alloy (CRA). Plastics liner sleeves are also known. The outer pipe resists buckling during spooling and unspooling and resists hydrostatic pressure when underwater. Conversely, the inner sleeve provides little mechanical strength, being just a few millimetres thick, but it protects the outer pipe from corrosive constituents of fluids carried by the pipe in use.

The use of two different materials in this way recognises that a pipe made entirely from corrosion-resistant material would be prohibitively expensive and yet could lack the essential mechanical properties that are provided by the strong outer wall of a lined pipe.

CRA-lined bimetallic pipes take two forms. The first is 'clad' pipe, in which an internal CRA liner sleeve is metallurgically bonded to the outer pipe. The second is 'mechanically lined pipe' or 'MLP', in which an interference fit between the liner sleeve and the outer pipe fixes the liner sleeve without metallurgical bonding. An example of MLP is supplied by H. Butting GmbH & Co. KG of Germany under the trade mark 'BuBi'.

To produce a length of MLP, a tubular liner sleeve is inserted telescopically into an outer pipe as a sliding fit and both are expanded radially by internal hydraulic pressure applied to the liner sleeve. The expanding liner sleeve undergoes radially-outward plastic deformation to apply radial expansion force to the outer pipe, which undergoes radially-outward plastic or elastic deformation as a result. Once the internal pressure is relaxed, radially-inward elastic shrinkage of the outer pipe onto the plastically-expanded liner sleeve effects a mechanical bond between the outer pipe and the liner sleeve.

MLP benefits from an economical production process that makes it much less expensive than clad pipe. This can save tens of millions of dollars in a large subsea project considering the many kilometres of lined pipe that may be required. However, MLP is susceptible to problems during spooling and unspooling that make it difficult to use in reel-lay applications. Specifically, under bending deformation, the thick-walled outer pipe may be structurally stable while the thin-walled inner liner sleeve of lower yield strength suffers significant deformation under the combined action of bending and external pressure from the outer pipe. This deformation manifests itself as buckling or wrinkling of the liner sleeve, especially around the intrados or inner curve of the pipe bend. A wrinkled liner sleeve may hinder the smooth flow of well fluids, may decrease fatigue life due to stress concentration and may preclude effective pigging of the pipeline.

In view of the wrinkling problem, the present invention is mainly concerned with MLP as opposed to metallurgically-bonded clad pipe for which wrinkling—of the liner at least—is not such a challenge. The invention is also concerned with plastics-lined pipes. Both MLP and plastics-lined pipes are characterised by the possibility of localised longitudinal slippage of the liner sleeve relative to the outer pipe upon bending deformation of the lined pipe, with consequent undesirable deformation of the liner sleeve manifested as wrinkling. However, in a broad sense, the invention could also have benefit when bending clad pipe and indeed when bending unlined pipe, if bending is such as to give rise to unwanted inward deformation of the pipe wall.

Wrinkling of the intrados of a pipe bend during bending is a well-known phenomenon. Standards such as ASME B31.3, API 5L and DNV-OS—F-101 recommend that wrinkling should be mitigated by choosing a pipe wall of suitable thickness. However, this approach cannot be applied to double-walled lined pipe in which the outer wall is designed primarily for mechanical strength but the inner wall is designed primarily for corrosion resistance and is made of a material with lower yield strength.

It is well known to use a pressurised fluid between two mandrels or plugs to avoid wrinkling of a single-walled pipe. A very old example is disclosed in US 203842.

Filling and pressurising a pipe is also commonplace when hydrotesting an installed pipe. In this respect, WO 2011/048430 proposes filling a pipeline completely with a pressurised fluid during hydrotesting in the pre-commissioning phase after laying, with the objective of flattening wrinkles after they have formed. This is not relevant to the invention, which aims to minimise wrinkles at source.

The principle of a mandrel has also been used for bimetallic or double-walled pipe to limit wrinkles during bending. For example, EP 0163056 discloses an articulated mandrel for bending double-walled pipeline. The mandrel is an internal solid body that pushes against or blocks growth of potential wrinkles to stop them from forming. More generally, use of a pressurised fluid or a solid material such as ice or sand between mandrels is known from FR 1056665, U.S. Pat. Nos. 2,777,500, 3,105,537 and WO 99/64180.

For various reasons, these methods are not practical for bending a pipe continuously onto or off a reel at a spoolbase as opposed to forming a single bend under factory conditions. For example, after a few turns upon spooling, the first, leading end of the pipe will become inaccessible under further turns of the pipe.

There are also prior art disclosures relating to the spooling of double-walled pipe in the oil and gas industry. Examples are the methods described in WO 2008/072970 (also published as U.S. Pat. No. 8,226,327), WO 2010/010390 and WO 2011/051218. These three methods have certain features in common. The pipeline, or at least a substantial part of the pipeline, is filled with a pressurising fluid. Also, one or more plugs are used at the ends of the pipeline. Those plugs have to be removed or displaced periodically.

There are some significant differences between the methods described in WO 2008/072970, WO 2010/010390 and WO 2011/051218. In WO 2008/072970, a new pipe section is welded on, the assembly is filled up with the fluid, the fluid is pressurised and the reel turns to spool the newly-assembled section. In WO 2010/010390, a new section is filled with pressurising fluid and is welded to the existing section. The junction is also filled with pressurising fluid. The fluid is pressurised and the reel turns to spool the newly-assembled section. In WO 2011/051218, the fluid is pressurised in two stages.

In order to reduce transit time, a reel-lay vessel may transport multiple reels together. Alternatively, the reels may be removable from the vessel offshore. In another approach, to which the present invention relates, different pipelines may be spooled in series on the same reel if the capacity of the reel is sufficient. However, the successive pipelines may not have the same characteristics in terms of their dimensions, materials or construction.

Conventionally, a transition piece or transition joint effects the transition between successively-reeled pipelines that have different characteristics, for example where conjoined pipelines have different diameters as explained in WO 93/08422. WO 93/08422 teaches that the transition joint should enable a smooth transfer of mechanical loads and bending loads between the opposed pipeline ends. For this purpose, the transition joint has a smooth tapered shape to manage the change in outer diameter so that the different pipelines can pass successively through the same spooling equipment and can then be stored together on the same reel.

Where the cross-sections of successive pipelines differ greatly, the transition joint may be more complex. For example, GB 2545786 shows a transition joint between a pipe-in-pipe pipeline and a single-wall pipe with a thick coating of thermal insulation.

During installation, the transition joint is cut out before abandoning the end of the first pipeline to the seabed and then initiating the installation of the second pipeline. A pipeline end accessory such as a pipeline end termination (PLET) or a pig launcher/receiver is typically welded to the cut end of either or both of the pipelines. WO 2013/175280 discloses a transition joint including a connection system that simplifies the connection of pipeline accessories at the end of both pipelines after cutting out the transition joint.

The present invention has been devised to facilitate the assembly, spooling, transportation and installation of water-filled pipelines where successive pipelines with different diameters are filled with water and spooled onto the same reel. The invention employs a method for assembling and spooling a water-filled pipeline akin to that described in WO 2008/072970 and U.S. Pat. No. 8,226,327, noting that pressurising, filling and refilling of the pipeline(s) is performed via the leading end of the first-spooled pipeline that is located on the reel. Water fills the pipeline(s) between the leading end, on the reel, and a pig that is displaced along the pipeline(s) by differential water pressure acting against friction between the pig and the surrounding pipe wall.

Against this background, the invention resides in a method of spooling first and second pipelines with different inner diameters successively onto a reel. For example, the second pipeline may have a greater inner diameter than the first pipeline.

The method of the invention comprises:
  assembling the first pipeline from a succession of pipe stalks while, cyclically, filling already-assembled pipe stalks with a pressurising liquid, elevating the pressure of the pressurising liquid and spooling the pipe stalks onto the reel while thereby pressurised internally;
  advancing a first, variable diameter pig within the first pipeline to a trailing end of the first pipeline;
  attaching a transition joint to the trailing end of the first pipeline, which transition joint has an inner diameter that transitions from the inner diameter of the first pipeline to the inner diameter of the second pipeline;
  attaching a leading end portion of the second pipeline to the transition joint, that leading end portion containing a second pig in sealing engagement therewith;
  driving the first pig through the transition joint into the leading end portion of the second pipeline, while effecting a change of diameter of the first pig to establish sealing engagement between the first pig and that leading end portion; and
  driving the first and second pigs along the second pipeline when assembling the second pipeline from a succession of pipe stalks while, cyclically, filling already-assembled pipe stalks with the pressurising liquid, elevating the pressure of the pressurising liquid and spooling the pipe stalks onto the reel while thereby pressurised internally.

Preferably, the first pig is driven into contact with the second pig and thereafter the first and second pigs may be driven together along the second pipeline. The first pig may, for example, be attached or coupled to the second pig.

The first pig conveniently has less resistance than the second pig to longitudinal slippage under differential pressure in the second pipeline.

The already-assembled pipe stalks are suitably filled with the pressurising liquid from a leading end of those pipe stalks, attached to the reel. An end closure may be attached to a trailing end of the already-assembled pipe stalks before filling those pipe stalks with the pressurising liquid. The end closure is preferably vented while the already-assembled pipe stalks are being filled with the pressurising liquid. Then, the already-assembled pipe stalks may be pressurised between the leading end and the end closure.

A liquid buffer may be introduced through the end closure into a trailing end portion of the already-assembled pipe stalks before those pipe stalks are filled with the pressurising liquid. On encountering the buffer after being driven along a pipeline by the pressurising liquid, a pig or a combination of pigs is left spaced from the trailing end. Then, the end closure is removed and the buffer is drained before another pipe stalk is welded to the trailing end.

Advantageously, the leading end portion of the second pipeline may be attached to the transition joint after the second pig has been positioned within that leading end portion.

The transition joint may be attached a leading end of a pipe stalk that defines the leading end portion of the second pipeline, or to an intermediate location along the length of such a pipe stalk.

Whilst the pipe stalks are assembled with permanent welds, the transition joint may be attached to the first and second pipelines with quicker, temporary welds.

Embodiments of the invention implement a method to spool two pipelines with different diameters, the pipeline having to be water-filled when spooled. The method comprises the following steps: assembling, filling, pressurising and spooling the smaller diameter pipeline, using a first pig capable of accommodating the smaller diameter pipeline and the wider diameter pipeline; stopping spooling when the end of the smaller diameter pipeline is reached; driving the first pig to said end; preparing a tapered transition joint whose inner diameter changes from the smaller diameter to the wider diameter; preparing at least a first end section of the wider diameter pipeline and inserting a second pig in said first end section; welding together the end of the smaller diameter pipeline and a smaller end of the transition joint; welding together a wider end of the transition joint and the first end section of the wider diameter pipeline; driving the first pig through the transition joint until it pushes the second pig; and restarting the assembling, filling, pressurising and spooling sequence of the end of the smaller pipeline, the transition joint and the wider pipeline, using the first and second pigs together as one unique pig.

The first and second pig can be coupled together, for example using a ratchet or spring-loaded connection.

The invention arose from a client requirement for pipelines of different diameters to be reeled together in a single trip of a reel-lay vessel, in order to comply with a challenging installation schedule.

The invention relates to propelling pigs for flooding and pressurisation of stalks being welded together during spooling operations at a spoolbase. Typically, the system is pressurised internally within the range of 5 bar to 50 bar, allowing fluctuations in this parameter without risking wrinkling of the internal liner.

The invention contemplates the provision of a transition joint with changing outer diameter (OD) and inner diameter (ID) welded between two differently-sized pipelines being spooled, in particular a pipeline having a smaller ID and a pipeline having a larger ID. The pipeline with the smaller ID should be spooled onto the reel first in order to allow proper displacement of a pig train within the system.

When pipe stalks with the smaller ID have been spooled, the pig train used for spooling those pipe stalks remains within the system for welding the transition joint and for welding at least the first section of pipeline having the larger ID. The first section of pipeline having the larger ID already contains a conventional pig train to facilitate spooling.

To allow the pig train used for spooling the pipe stalks with the smaller ID to pass correctly into the pipeline with the larger ID, that pig train has multi-diameter discs to ensure concentric positioning within the system when running from the smaller ID pipe into the larger ID pipe.

On reaching the larger ID pipe, bent discs or cups of the pig train return to their original shape matching the larger ID. In this way, the pig train is propelled properly along the larger ID pipe stalks during flooding and pressurisation for spooling.

In summary, lined pipelines with different inner diameters are spooled successively onto a reel while their constituent pipe stalks are cyclically pressurised internally to combat wrinkling of the liner.

A first, variable diameter pig is advanced to a trailing end of a first pipeline. A transition joint is attached to the trailing end of the first pipeline to effect a transition from the inner diameter of the first pipeline to the different inner diameter of a second pipeline. A leading end of the second pipeline, containing a second pig, is attached to the transition joint.

The first pig is driven through the transition joint into the second pipeline. The diameter of the first pig changes to match the inner diameter of the second pipeline. The first and second pigs are then driven along the second pipeline when assembling the second pipeline from a succession of pipe stalks.

In order that the invention may be more readily understood, reference will now be made, by way of example, to the accompanying drawings in which.

Figure 1:
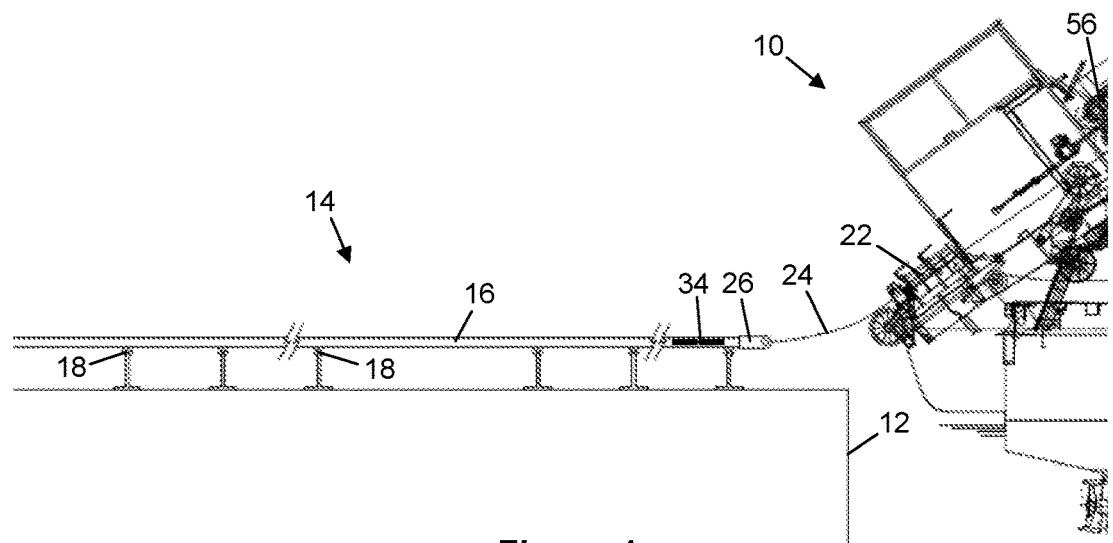
FIG. 1 is a schematic sectional side view of a reel-lay vessel at a spoolbase, showing an initial pipe stalk ready for spooling onto a reel of the vessel.
Figure 4:
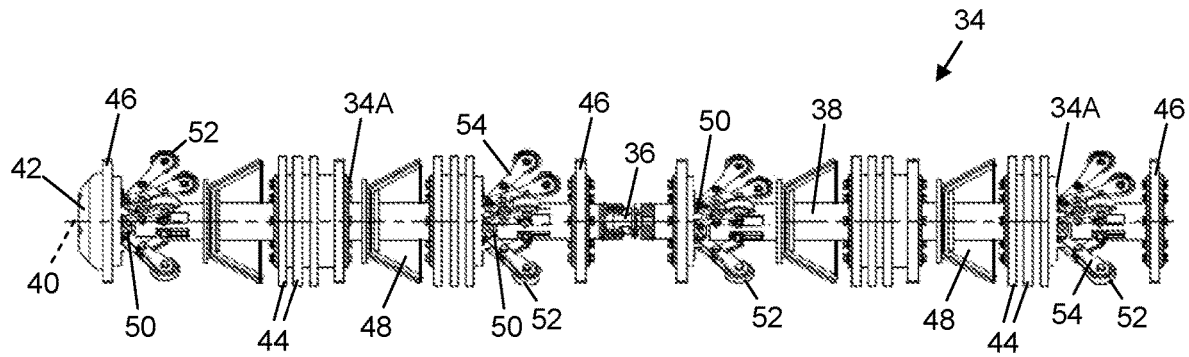
FIG. 4 is a side view of a first pig shown schematically at the leading end of the pipe stalk in FIG. 1, in a laterally-contracted state to fit within a narrower pipeline having a relatively small internal diameter.
Figure 5:
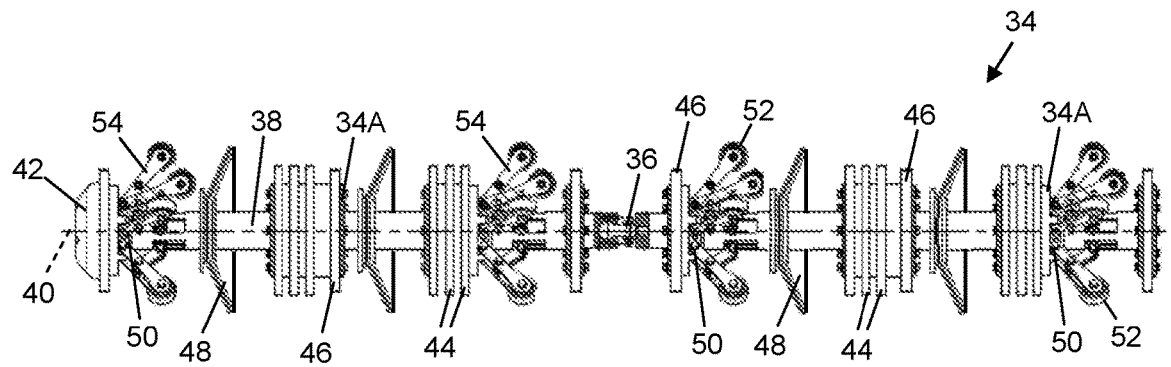
Figure 6:
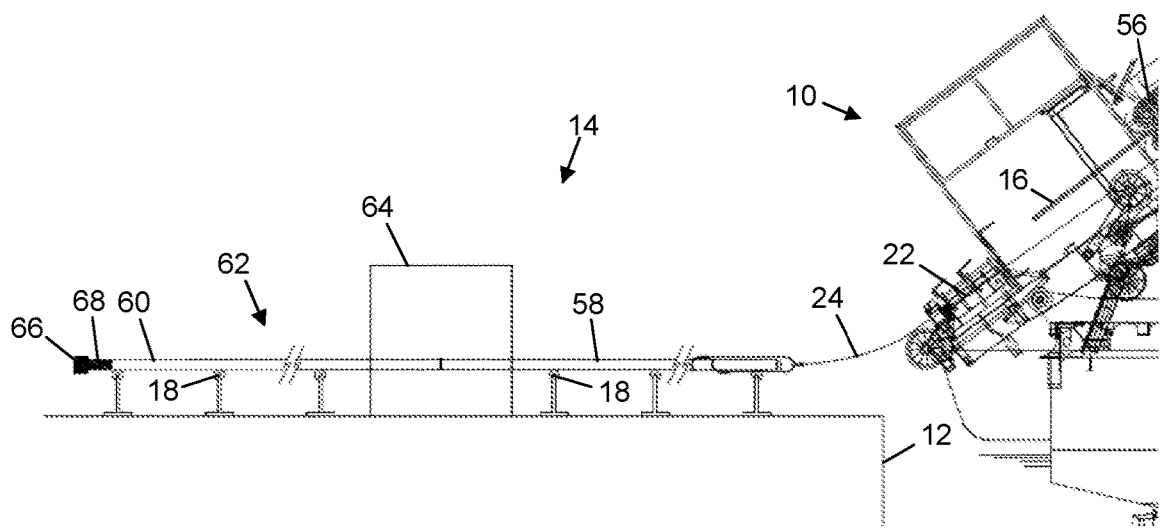
Figure 7:
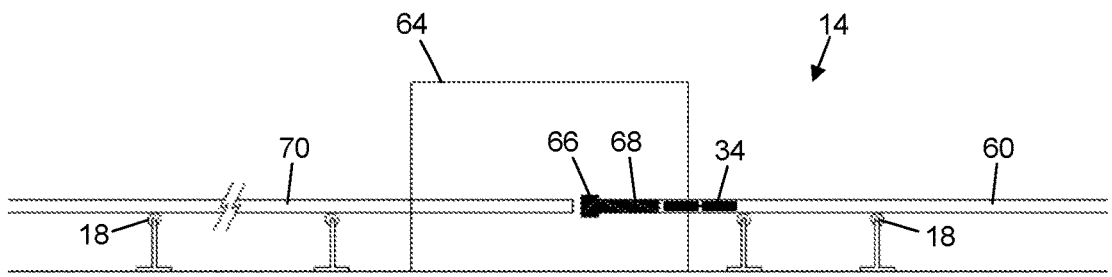
Figure 8:
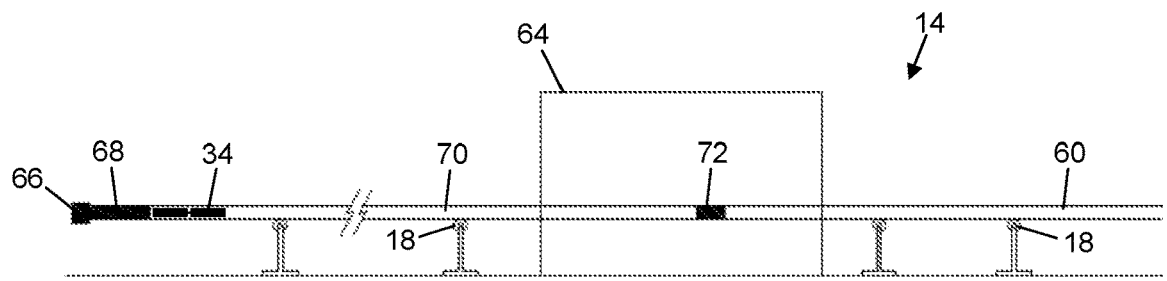
Figure 9:
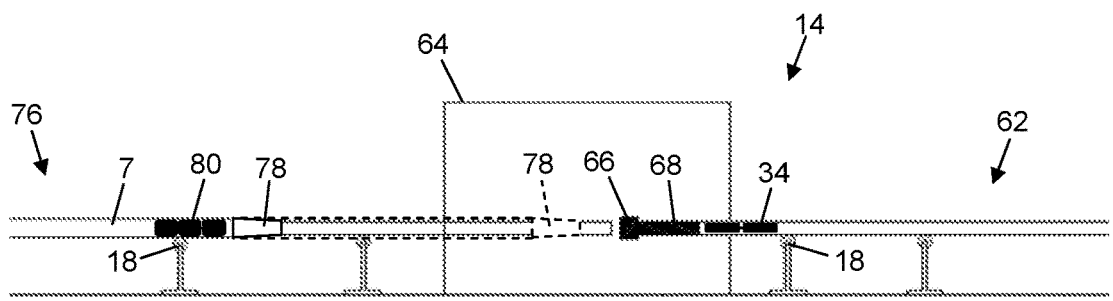
Figure 10:
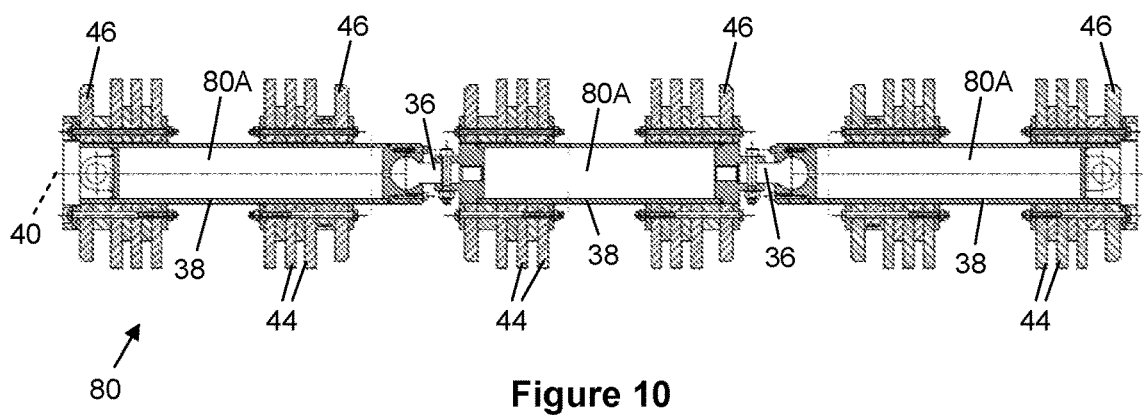
Figure 11:
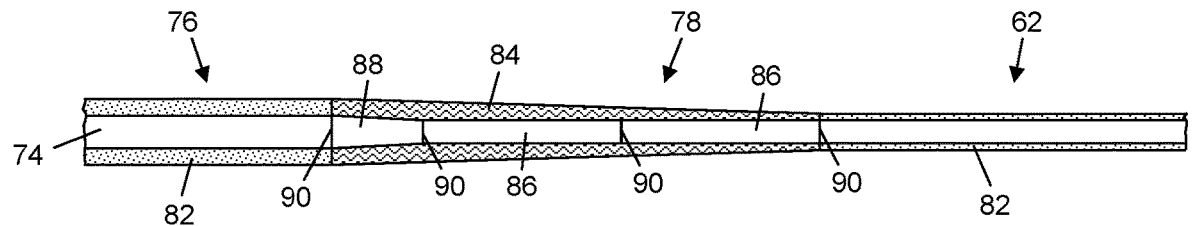
Figure 12:
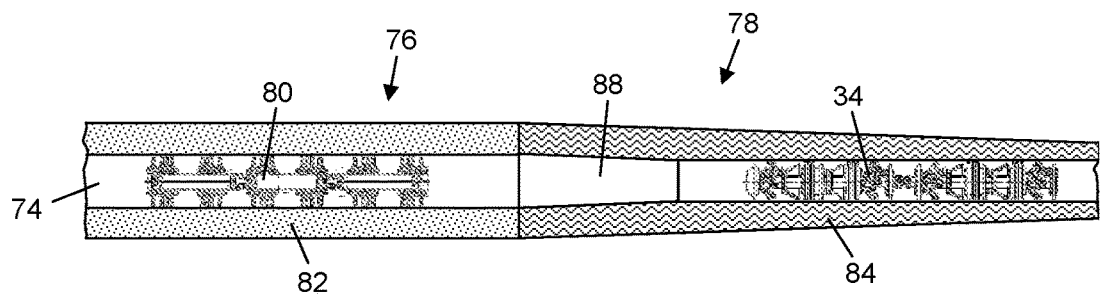
Figure 13:
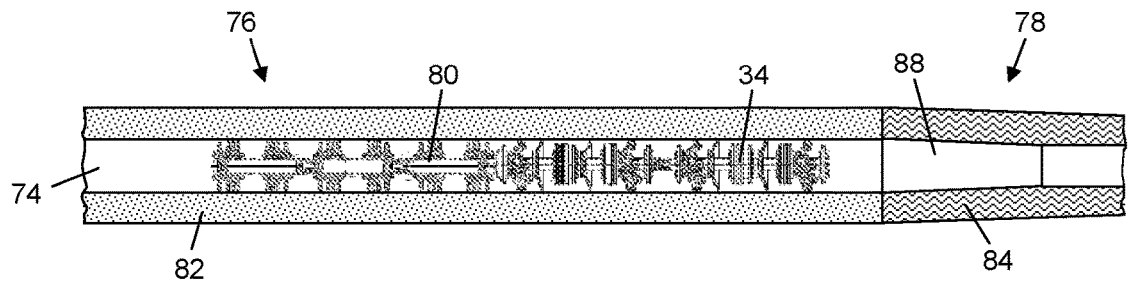
Figure 14:
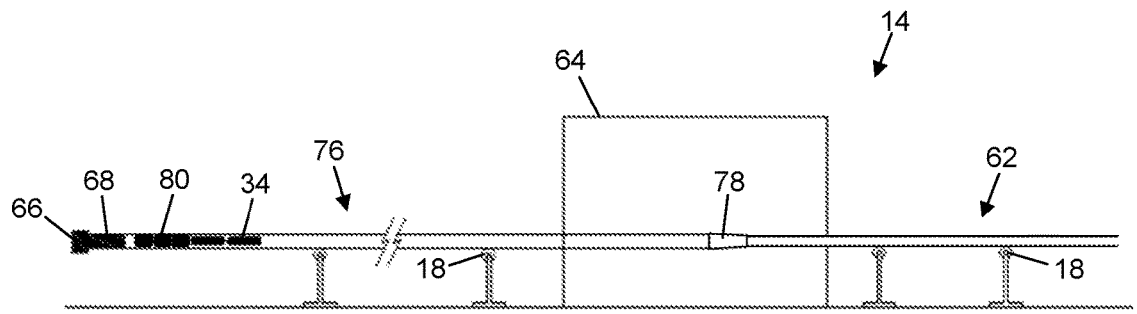

FIG. 5 corresponds to FIG. 4 but shows the first pig in a laterally-expanded state to fit within a wider pipeline having a relatively large internal diameter;

FIG. 6 corresponds to FIG. 1 but shows a first product pipe stalk at the spoolbase, ready to be tied in to the lead string that is already aboard the vessel;

FIG. 7 is a schematic sectional side view of the spoolbase of FIG. 1, showing the next product pipe stalk being tied in to the first product pipe stalk;

FIG. 8 corresponds to FIG. 7 but shows the next product pipe stalk now tied in and being prepared for the first product pipe stalk to be spooled;

FIG. 9 corresponds to FIG. 7 but shows a first product pipe stalk of a wider pipeline about to be tied in to a final product pipe stalk of a narrower pipeline;

FIG. 10 is a side view of a second pig shown within the wider pipeline in FIG. 9;

FIG. 11 is a schematic sectional side view of a temporary transition joint for effecting a smooth transition between the narrower and wider pipelines in FIG. 9;

FIG. 12 is an enlarged schematic sectional side view of the first and second pigs facing each other across a transition piece of the transition joint;

FIG. 13 corresponds to FIG. 12 but shows the first pig advanced through the transition piece into engagement with the second pig in the first product pipe stalk of the wider pipeline; and FIG. 14 corresponds to FIG. 8 but shows the adjoining first and second pigs of FIG. 13 advanced together to a trailing end of the first product pipe stalk of the wider pipeline.

Figure 2:
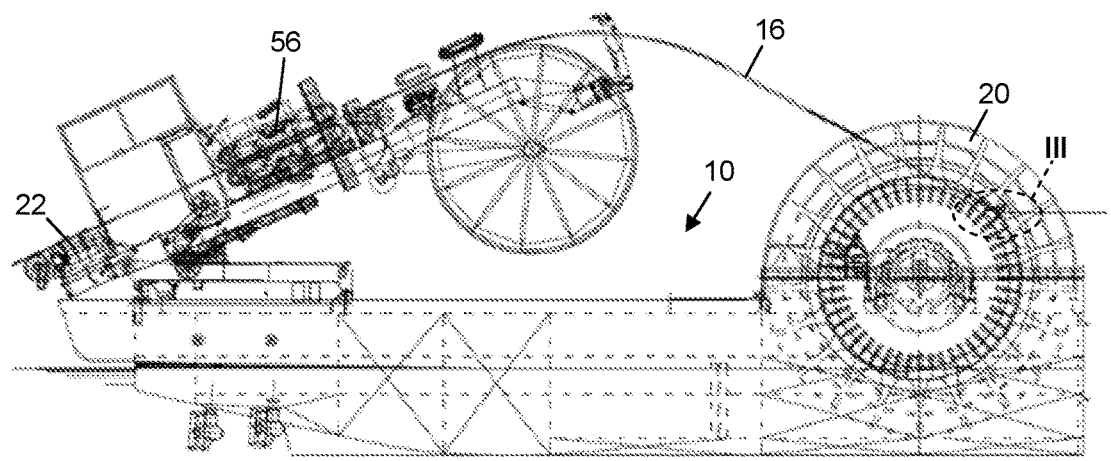
FIG. 2 is a side view of the vessel showing the leading end of the pipe stalk now engaged with a reel of the vessel.

FIG. 1 of the drawings shows a reel-lay vessel 10 alongside a quayside 12 when visiting a coastal spoolbase 14 to be loaded with successive pipelines. An initial pipe stalk 16 is shown supported by a series of rollers 18 ready for spooling onto a reel 20 of the vessel 10 via an inclined reel-lay tower or ramp 22 at the stem of the vessel 10, as best shown in FIG. 2.

In this example, the initial pipe stalk 16 is used to establish mechanical and fluid coupling with the reel 20 and is then used for performing straightening trials. Next, corresponding product pipe stalks connected to the initial pipe stalk 16 are loaded onto the reel 20 in succession to assemble a pipeline of the desired length.

By way of example, the initial pipe stalk 16 and the series of product pipe stalks joined to it form a first pipeline of a relatively narrow pipe, with an inner diameter of say six inches (152.4 mm). A narrow pipeline such as this may be appropriate for injecting fluids into a subsea well, such as in a water alternating gas (WAG) injection system.

As will be explained later, a second pipeline to be spooled onto the reel 20 at the trailing end of the first pipeline is of a relatively wide pipe, with an inner diameter of say eight inches (203.2 mm). A wider pipeline such as this may be appropriate for conveying hydrocarbon production fluid from a subsea well or between subsea installations.

The first and second pipelines both serve as flowlines on the seabed and may also be suspended above the seabed as catenary risers.

The initial pipe stalk 16 comprises a lead string at its leading end and a tail string at its trailing end. An intermediate portion of the initial pipe stalk 16 between the lead string and the tail string is used for the aforementioned straightening trials.

A pull-in line 24 is attached to a pull-in head 26 at the leading end of the initial pipe stalk 16, as shown in FIG. 1, to winch the initial pipe stalk 16 up the reel-lay ramp 22 and onto the reel 20 as shown in FIG. 2.

Figure 3:
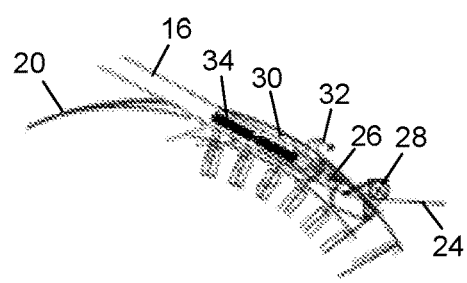
FIG. 3 is an enlarged sectional view corresponding to Detail III of FIG. 2.

The detail view of FIG. 3 shows the pull-in line 24 running around a reeling sheave 28 on the reel 20, shown here deployed from the reel 20 in an extended position. The pull-in line 24 extends from the sheave 28 to a winch, not shown. As is conventional, tension applied by the winch to the pull-in line 24 draws the pull-in head 26 of the initial pipe stalk 16 into engagement with a pipe catcher 30 in a pocket of the reel 20.

A flooding/discharge hose 32 is fluidly connected to the initial pipe stalk 16 via the pull-in head 26 engaged with the reel 20. The flooding/discharge hose 32 is used to fill the pipeline with water and then to apply internal fluid pressure to the pipeline to combat wrinkling of the liner when spooling successive product pipe stalks onto the reel 20.

FIGS. 1 and 3 show a first pig 34 loaded into the initial pipe stalk 16 and positioned close to the leading end of the lead string, just behind the pull-in head 26. Conveniently, the first pig 34 is loaded into the leading end of the initial pipe stalk 16 before the pull-in head 26 is welded onto the initial pipe stalk 16. Otherwise, the first pig 34 could be advanced along the initial pipe stalk 16 from the trailing end.

The first pig 34 is shown in detail in FIGS. 4 and 5. It will be apparent that, in this example, the first pig 34 is a pig train comprising a pair of similar pig elements 34A connected end-to-end by an articulated joint 36. For simplicity, references in this specification to a pig are intended to encompass a pig train comprising two or more pig elements.

The first pig 34 shown in FIGS. 4 and 5 has variable diameter. Specifically, the first pig 34 can adopt a laterally-contracted state as shown in FIG. 4 or a laterally-expanded state as shown in FIG. 5. The first pig 34 adopts the laterally-contracted state shown in FIG. 4 when within a relatively narrow pipe, such as the aforementioned WAG pipeline with an inner diameter of six inches (152.4 mm). Conversely, the first pig 34 adopts the laterally-expanded state shown in FIG. 5 when within a relatively wide pipe, such as the aforementioned production pipeline with an inner diameter of eight inches (203.2 mm).

The first pig 34 comprises a shaft 38 extending along a central longitudinal axis 40. A bumper nose 42 is positioned at one end of the shaft 38.

Resilient sealing discs 44 are grouped in parallel planes that are orthogonal to the central longitudinal axis 40. The groups of sealing discs 44 are spaced longitudinally along the shaft 38 and have an outer diameter that is slightly greater than the inner diameter of the first pipeline. Strong frictional engagement between the multiple sealing discs 44 and the inner surface of the first pipeline enables the first pig 34 to withstand high differential pressure (for example, a gauge differential pressure of 4 bar) without longitudinal slippage when positioned in that narrower pipeline.

Relatively rigid individual guide discs 46 are mounted to the shaft 38 at the ends of the first pig 34 and are also interspersed along the shaft 38 between the groups of sealing discs 44. The guide discs 46 are in planes that are parallel to the sealing discs 44. However, the guide discs 46 are slightly smaller in the radial direction so as to be a close sliding fit within the narrower pipeline. The guide discs 46 thereby keep the first pig 34 in concentric relation within the narrower pipeline.

Frusto-conical collapsible cups 48 are also interspersed along the shaft 38 between the groups of sealing discs 44. The cups 48 all taper in the same longitudinal direction, toward the bumper nose 42. The cups 48 are shown collapsed inwardly in FIG. 4 and expanded outwardly in FIG. 5.

The collapsible cups 48 are resiliently elastic so as to self-bias toward planarity. Thus, the circular periphery of each cup 48 is urged radially outwardly against the inner surface of a surrounding pipe as the cup 48 expands radially to an extent permitted by the inner diameter of that pipe.

Radial expansion of the collapsible cups 48 ensures that when the first pig 34 is in a pipe with a relatively large inner diameter, in particular the wider second pipeline, the cups 48 continue to seal against the inner surface of the pipe. As there is then a clearance around the sealing discs 44, the first pig 34 cannot withstand such a high differential pressure without longitudinal slippage when in the wider pipeline. However, by virtue of expansion of the cups 48, there is sufficient sealing between the first pig 34 and the wider pipeline for the first pig 34 to be propelled easily along that pipeline by differential fluid pressure on respective ends of the first pig 34.

Similarly, the fixed-diameter guide discs 46 cannot maintain a close sliding fit within the wider second pipeline. Consequently, the first pig 34 is held concentrically within the wider pipeline by a supplementary wheeled support system. The wheeled support system comprises wheel sets 50 spaced longitudinally along the shaft 38.

The wheels 52 of each wheel set 50 are spaced angularly around the central longitudinal axis 40 and are supported by respective pivotable arms 54 that are biased in a radially outward direction. Thus, the arms 54 can fold inwardly toward the shaft 38, as shown in FIG. 4, when the first pig 34 is in the narrower first pipeline, and pivot outwardly away from the shaft 38 into a deployed position, as shown in FIG. 5, when the first pig 34 moves into the wider second pipeline.

The arms 54 that support the wheels 52 converge with the shaft 38 and the central longitudinal axis 40 in the same longitudinal direction, toward the bumper nose 42 at one end of the shaft 38. In general, during spooling operations, the first pig 34 will move along a pipeline in a direction such that the bumper nose 42 is at the leading end of the first pig 34.

However, the first pig 34 may experience some brief reversals of direction as the pipeline is depressurised before adding each pipe stalk.

The wheeled support system is shown for illustrative purposes only. Other types of pigs known by those skilled in the art may be suitable for the same purpose.

The aforementioned straightening trials that follow after the initial pipe stalk 16 has been loaded onto the vessel 10 are optional. Those trials may involve raising the reel-lay ramp 22 to an upright orientation and may be performed without flooding or pressurising the interior of the initial pipe stalk 16. Once those trials are complete, the tail string and the intermediate portion of the initial pipe stalk 16 are cut away, leaving the lead string at the leading end of the initial pipe stalk 16 engaged with the reel 20 and extending through tensioners 56 of the reel-lay ramp 22. At this stage, the first pig 34 remains within the lead string of the initial pipe stalk 16. The reel-lay ramp 22 is then lowered back to the spooling angle with the trailing end of the lead string of the initial pipe stalk 16 protruding from the tensioners 56 as shown in FIG. 6.

FIG. 6 also shows first and second product pipe stalks 58, 60 of the first pipeline 62 now positioned on the rollers 18 on the quayside 12 at the spoolbase 14. The product pipe stalks 58, 60 are made of the same pipe as the initial pipe stalk 16 and are welded together end-to-end at a welding station in a tie-in shed 64 of the spoolbase 14.

A pull-in line 24 is attached to the leading end of the first product pipe stalk 58, which is pulled onto the vessel 10 and welded to the residual lead string of the initial pipe stalk 16 to start assembling the first pipeline 62. At the other end of the pipe assembly, an end plug 66 is inserted into the trailing end of the second product pipe stalk 60, before or after pull-in.

Consequently, the emergent first pipeline 62 defines a continuous internal volume that extends along the lead string of the initial pipe stalk 16 and into and along the conjoined first and second product pipe stalks 58, 60. That volume can be flooded and pressurised through the flooding/discharge hose 32 that is fluidly connected to the initial pipe stalk 16 at the reel 20.

The end plug 66 is penetrated by a vent port that is initially kept open to facilitate flooding of the conjoined pipe stalks 16, 58, 60. Also, a slug of water 68 is injected through the vent port into the trailing end of the second product pipe stalk 60. That slug of water 68 serves as a buffer for receiving the first pig 34. In this respect, the introduction of high-pressure water through the flooding/discharge hose 32 creates a differential pressure of greater than, for example, 4 bar which therefore exceeds the capacity of the first pig 34 to resist longitudinal slippage within the initial pipe stalk 16. This differential pressure propels the first pig 34 along the initial pipe stalk 16 and into and along the first and second product pipe stalks 58, 60.

The first pig 34 ends up close to the trailing end of the second product pipe stalk 60 as shown in FIG. 7, with the buffer slug of water 68 between the first pig 34 and the end plug 66. In this way, the first pig 34 is kept spaced from the trailing end of the second product pipe stalk 60. The vent port in the end plug 66 is then closed, allowing the flooded volume within the emergent first pipeline 62 defined by the conjoined pipe stalks 16, 58, 60 to be pressurised to, for example, a gauge pressure of 48 bar. The first product pipe stalk 58 can now be spooled onto the reel 20 without a risk of its liner becoming wrinkled.

As the first product pipe stalk 58 is advanced onto the reel 20, the trailing end of the second product pipe stalk 60 is brought into line with the welding station in the tie-in shed 64 as shown in FIG. 7. Spooling is then paused and the second product pipe stalk 60 is clamped in position so as not to move relative to the rollers 18.

The emergent first pipeline 62 defined by the conjoined pipe stalks 16, 58, 60 is then depressurised through the flooding/discharge hose 32, for example to a gauge pressure of 3 bar, whereupon the vent port of the end plug 66 may be opened to bleed residual pressure from the volume between the first pig 34 and the end plug 66. The end plug 66 can then be removed to drain the buffer slug of water 68 from the trailing end of the second product pipe stalk 60. The first pig 34 holds back the pressurised body of water within the conjoined pipe stalks 16, 58, 60.

It will be apparent that by virtue of the drained slug of water 68, the first pig 34 will remain spaced from, and recessed within, the trailing end of the second product pipe stalk 60. This facilitates welding the trailing end of the second product pipe stalk 60 to the leading end of a third product pipe stalk 70, shown aligned with the second product pipe stalk 60 in FIG. 7. This extends the emergent first pipeline 62 by the length of the third product pipe stalk 70.

FIG. 8 shows the weld between the second product pipe stalk 60 and the third product pipe stalk 70 now coated at a coating station in the tie-in shed 64 to complete a field joint 72. The end plug 66 is shown inserted into the trailing end of the third product pipe stalk 70. The vent port of the end plug 66 is initially open, whereby another slug of water 68 is injected through the vent port into the trailing end of the third product pipe stalk 70 to serve as a buffer for the first pig 34. Next, the introduction of high-pressure water through the flooding/discharge hose 32 at the reel 20 floods the emergent first pipeline 62 and propels the first pig 34 from the second product pipe stalk 60 into and along the third product pipe stalk 70. Again, the buffer slug of water 68 stops the first pig 34 before the first pig 34 reaches the end plug 66. The vent port in the end plug 66 is then closed and the emergent first pipeline is re-pressurised to avoid wrinkling of the liner as the second product pipe stalk 60 is spooled onto the reel 20.

The above steps are repeated cyclically until the final product pipe stalk of the first pipeline 62 has advanced to the welding station at the tie-in shed 64. The first product pipe stalk 74 of the second, wider pipeline 76 can then be prepared for welding onto the trailing end of the first pipeline 62, with reference to FIG. 9.

The first product pipe stalk 74 of the second pipeline 76 is shown aligned with the trailing end of the first pipeline 62 in FIG. 9. The first pig 34 has been driven to the trailing end of the first pipeline 62. The first pipeline 62 will then be depressurised, the vent port of the end plug 66 will be opened and the end plug 66 will be removed to drain the buffer slug of water 68 from the trailing end of the first pipeline 62. This will leave the first pig 34 spaced from, and recessed within, the trailing end of the first pipeline 62 to facilitate welding.

FIG. 9 shows a tapered, frusto-conical transition joint 78 for effecting a temporary transition between the narrower first pipeline 62 and the wider second pipeline 76. The transition joint 78 may be positioned at an intermediate position along the first product pipe stalk 74 of the second pipeline 76, as shown here in solid lines, or at a position at or close to the leading end of that product pipe stalk 74, as shown here in dashed lines. The latter position is preferred as the transition joint 78 may then incorporate one or more pup pieces of the narrower pipe, as will be explained below with reference to FIG. 11.

A second pig 80 is pre-installed within the wider second pipeline 76, close to the trailing end of the transition joint 78. The second pig 80 is shown in detail in FIG. 10. Again, it will be apparent that the second pig 80 is a pig train, in this case comprising a series of three similar pig elements 80A connected end-to-end by articulated joints 36. As various features of the second pig 80 are similar to features of the first pig 34, like numerals are used for like features.

The second pig 80 comprises a shaft 38 extending along a central longitudinal axis 40 and resilient sealing discs 44 grouped in parallel planes that are orthogonal to the central longitudinal axis 40. The groups of sealing discs 44 are spaced longitudinally along the shaft 38 and have an outer diameter that is slightly greater than the inner diameter of the second pipeline 76. Strong frictional engagement between the multiple sealing discs 44 and the inner surface of the second pipeline 76 enables the second pig 80 to withstand high differential pressure when positioned in that pipeline 76. Again, a typical differential pressure in this instance will be a gauge pressure of 4 bar.

Relatively rigid individual guide discs 46 are mounted to the shaft 38 beside each group of sealing discs 44. The guide discs 46 are in planes that are parallel to the sealing discs 44 but are slightly smaller in the radial direction so as to be a close sliding fit within the second pipeline 76. The guide discs 46 thereby keep the second pig 80 in concentric relation within the second pipeline 76.

The transition joint 78 is shown in longitudinal section in FIG. 11, which is not to scale.

The first and second pipelines 62, 76 are fabricated of carbon steel pipe that is mechanically-lined with a thin internal liner of a corrosion-resistant alloy such as Inconel 625. The first and second pipelines 62, 76 also have external coatings 82 for corrosion protection and thermal insulation.

The external coating 82 of the first pipeline 62 is relatively thin, such as a three-layer polypropylene (3LPP) coating. The external coating 82 of the second pipeline 76 is relatively thick, such as a five-layer polypropylene (5LPP) coating, to provide greater thermal insulation. Consequently, the outer diameter of the second pipeline 76 is markedly greater than the outer diameter of the first pipeline 62, for example by about 120 mm.

To effect a smooth transition between the different outer diameters of the first and second pipelines 62, 76, the transition joint 78 comprises a continuous intermediate tubular coating 84 of, for example, polypropylene that is machined or moulded into a long shallow taper, for example of about 26 m in length. The intermediate coating 84 surrounds tubular pup pieces 86 that are temporarily welded to each other end-to end. The pup pieces 86 are of pipe having the same internal diameter as the narrower first pipeline 62. Each pup piece 86 may, for example, have a length of about 11 m.

One of the pup pieces 86 is welded temporarily to the trailing end of the first pipeline 62. The other pup piece 86 is welded temporarily to the correspondingly narrow end of a flared frusto-conical transition piece 88. The wide end of the transition piece 88 is welded temporarily to the first product pipe stalk 74 of the second, correspondingly wide pipeline 76.

The transition piece 88 may be forged or may be fabricated by rolling and longitudinally welding a steel plate. The transition piece 88 may, for example, have a length of about 4 m.

Advantageously, the abovementioned temporary welds 90 are quick to complete as they do not require the same quality in terms of sealing integrity or longevity as the permanent inter-stalk welds of the pipelines 62, 76, such as at the field joint 72 in FIG. 8. Consequently, less exhaustive weld testing is required. Also, there is no need to apply a permanent field joint coating. The intermediate coating 84 is sufficient to protect the temporary welds 90 from corrosion until the pipelines 62, 76 are installed.

Moving on to FIGS. 12 and 13, these enlarged longitudinal sectional views of the transition joint 78 show the interaction between the first and second pigs 34, 80. FIG. 12 shows the first and second pigs 34, 80 facing each other across the transition piece 88. Next, the reintroduction of high-pressure water through the flooding/discharge hose 32 of the reel 20 floods the first pipeline 62 and drives the first pig 34 through the transition piece 88 and into the first product pipe stalk 74 of the second pipeline 76, as shown in FIG. 13. There, the first pig 34 expands laterally to maintain a sliding seal within the wider second pipeline 76. The first pig 34 also bears against the second pig 80 to push the second pig 80 along the first product pipe stalk 74 of the second pipeline 76.

Finally, FIG. 14 shows the adjoining first and second pigs 34, 80 advanced together to a trailing end of the first product pipe stalk 74 of the second pipeline 76. As before, an end plug 66 is shown inserted into that trailing end. To facilitate flooding, a vent port of the end plug 66 is initially open. Before flooding, a slug of water 68 is injected through the vent port into the trailing end to serve as a buffer for the first and second pigs 34, 80, stopping them before the second pig 80 reaches the end plug 66. The vent port in the end plug 66 is then closed and the first pipeline 62 and the first product pipe stalk 74 of the second pipeline 76 are re-pressurised to avoid wrinkling of the liner as the remainder of the first pipeline 62 is spooled onto the reel 20.

Similar steps are repeated with the addition of further product pipe stalks of the second pipeline 76 until the final product pipe stalk of the second pipeline 76 has been spooled onto the reel 20. The vessel 10 is now loaded with the first and second pipelines 62, 76 in series on the reel 20 and so can depart to an installation location.

At the installation location, the second pipeline 76 is unspooled, straightened and laid and then the first pipeline 62 is unspooled, straightened and laid after cutting out the transition joint 78. Pipeline end accessories are welded to the respective pipelines 62, 76 as required. In-line accessories may also be added to the pipelines 62, 76 by cutting the pipelines 62, 76 at appropriate intermediate points.

Many variations are possible within the inventive concept. For example, if straightening trials are omitted, the first product pipe stalk can simply be welded onto the trailing end of the initial pipe stalk, flooded, pressurised and spooled onto the reel. Then, further pipe stalks can be added successively to assemble the first pipeline as the preceding pipe stalk is spooled onto the reel.

The first and second pigs may be designed to couple together when the first pig is driven through the transition joint to abut the second pig. For this purpose, the first and second pigs may have complementary engagement formations. For example, the bumper nose of the first pig may be shaped to engage within a socket at the facing end of the second pig. The first and second pigs will then be linked to travel together along the pipe stalks of the second pipeline with each successive re-pressurisation and spooling cycle. The second pig will tend to restrain the first pig against reverse movement on depressurisation between those cycles.

The invention claimed is:

1. A method of spooling first and second pipelines with different inner diameters successively onto a reel, the method comprising:
    assembling the first pipeline from a succession of pipe stalks while, cyclically, filling already assembled pipe stalks with a pressurising liquid, elevating the pressure of the pressurising liquid and spooling the pipe stalks onto the reel while thereby pressurised internally;
    advancing a first, variable diameter pig within the first pipeline to a trailing end of the first pipeline;
    attaching a transition joint to the trailing end of the first pipeline, which transition joint has an inner diameter that transitions from the inner diameter of the first pipeline to the inner diameter of the second pipeline;
    attaching a leading end portion of the second pipeline to the transition joint, that leading end portion containing a second pig in sealing engagement therewith;
    driving the first pig through the transition joint into the leading end portion of the second pipeline, while effecting a change of diameter of the first pig to establish sealing engagement between the first pig and that leading end portion; and
    driving the first and second pigs along the second pipeline when assembling the second pipeline from a succession of pipe stalks while, cyclically, filling already assembled pipe stalks with the pressurising liquid, elevating the pressure of the pressurising liquid and spooling the pipe stalks onto the reel while thereby pressurised internally.

2. The method of claim 1, comprising driving the first pig into contact with the second pig and thereafter driving the first and second pigs together along the second pipeline.

3. The method of claim 2, comprising attaching the first pig to the second pig.

4. The method of claim 1, wherein the second pipeline has a greater inner diameter than the first pipeline.

5. The method of claim 4, wherein the first pig has less resistance than the second pig to longitudinal slippage under differential pressure in the second pipeline.

6. The method of claim 1, comprising filling the already assembled pipe stalks with the pressurising liquid from a leading end of those pipe stalks, attached to the reel.

7. The method of claim 6, comprising attaching an end closure to a trailing end of the already assembled pipe stalks before filling those pipe stalks with the pressurising liquid.

8. The method of claim 7, comprising introducing a liquid buffer through the end closure into a trailing end portion of the already assembled pipe stalks before filling those pipe stalks with the pressurising liquid.

9. The method of claim 7, comprising venting the end closure while filling the already assembled pipe stalks with the pressurising liquid.

10. The method of claim 7, comprising pressurising the already assembled pipe stalks between the leading end and the end closure.

11. The method of claim 1, comprising attaching the leading end portion of the second pipeline to the transition joint when the second pig is within that leading end portion.

12. The method of claim 1, comprising attaching the transition joint to a leading end of a pipe stalk that defines the leading end portion of the second pipeline.

13. The method of claim 1, comprising attaching the transition joint to an intermediate location along the length of a pipe stalk that defines the leading end portion of the second pipeline.

14. The method of claim 1, comprising assembling the pipe stalks with permanent welds and attaching the transition joint to the first a td second pipelines with temporary welds.

* * * * *